US012744936B2

(12) United States Patent
Ahn et al.

(10) Patent No.: US 12,744,936 B2
(45) Date of Patent: Sep. 22, 2026

(54) METHOD AND DEVICE FOR PATCH UNIT MESH CODING

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 0 days.

(21) Appl. No.: 18/865,941

(22) PCT Filed: May 8, 2023

(86) PCT No.: PCT/KR2023/006196
§ 371 (c)(1),
(2) Date: Nov. 14, 2024

(87) PCT Pub. No.: WO2023/224299
PCT Pub. Date: Nov. 23, 2023

(65) Prior Publication Data

US 2025/0324090 A1 Oct. 16, 2025

(30) Foreign Application Priority Data

May 16, 2022 (KR) ........................ 10-2022-0059436
May 3, 2023 (KR) ........................ 10-2023-0057829

(51) Int. Cl.
*H04N 19/597* (2014.01)
*H04N 19/172* (2014.01)
(Continued)

(52) U.S. Cl.
CPC ......... *H04N 19/597* (2014.11); *H04N 19/172* (2014.11); *H04N 19/33* (2014.11); *H04N 19/51* (2014.11)

(58) Field of Classification Search
CPC .... H04N 19/597; H04N 19/172; H04N 19/33; H04N 19/51
See application file for complete search history.

(56) References Cited

U.S. PATENT DOCUMENTS 9,749,609 B2 8/2017 Ahn
12,284,349 B2 * 4/2025 Nguyen Canh ...... H04N 19/597
(Continued)

FOREIGN PATENT DOCUMENTS

CN 118803256 A * 10/2024 ........... H04N 19/136
KR 101844297 B1 4/2018
(Continued)

OTHER PUBLICATIONS

International Search Report cited in corresponding international application No. PCT/KR2023/006196; Aug. 30, 2023; 11 pp.

*Primary Examiner* — Justin W Rider
(74) *Attorney, Agent, or Firm* — Lempia Summerfield Katz LLC

(57) ABSTRACT

A method and an apparatus are disclosed for patch-based mesh coding. In the disclosed embodiments, a mesh decoding device decodes a bitstream to reconstruct patch information and a patch-based base mesh. The mesh decoding device reconstructs base mesh vertices and connectivity by using the patch information and the patch-based base mesh. The mesh decoding device generates predicted vertices and connectivity based on the reconstructed base mesh vertices and connectivity. The mesh decoding device decodes a bitstream to reconstruct a transform-coefficient image, and reconstructs vector differences of vertices by unpacking, inverse quantizing and inverse transforming the transform-
(Continued)

coefficient image. The mesh decoding device adds the predicted vertices and the vector differences to reconstruct mesh vertices and connectivity.

18 Claims, 15 Drawing Sheets

(51) Int. Cl.
*H04N 19/33* (2014.01)
*H04N 19/51* (2014.01)

(56) References Cited

U.S. PATENT DOCUMENTS

| | | | | |
|---|---|---|---|---|
| 2014/0168360 | A1 | 6/2014 | Ahn | |
| 2021/0174551 | A1* | 6/2021 | Graziosi | G06T 17/20 |
| 2022/0028119 | A1 | 1/2022 | Rhyu | |
| 2022/0070493 | A1 | 3/2022 | Mammou | |
| 2022/0108482 | A1* | 4/2022 | Graziosi | G06T 9/001 |
| 2022/0108483 | A1* | 4/2022 | Graziosi | G06T 9/001 |
| 2023/0290063 | A1* | 9/2023 | Mammou | G06T 17/20 |

FOREIGN PATENT DOCUMENTS

| | | | |
|---|---|---|---|
| KR | 20210096285 | A | 8/2021 |
| WO | 2022023002 | A1 | 2/2022 |

* cited by examiner 3D space

UV space

METHOD AND DEVICE FOR PATCH UNIT MESH CODING

CROSS-REFERENCE TO RELATED APPLICATIONS

This application is a U.S. national stage of International Application No. PCT/KR2023/006196, filed on May 8, 2023, which claims priority to Korean Patent Application No. 10-2022-0059436, filed on May 16, 2022, and Korean Patent Application No. 10-2023-0057829, filed on May 3, 2023, the entire contents of each of which are hereby incorporated herein by reference.

TECHNICAL FIELD

The present disclosure relates to a patch-based mesh coding method and apparatus.

BACKGROUND

The statements in this section merely provide background information related to the present disclosure and do not necessarily constitute prior art.

In the MPEG meeting in April of 2022, among the responses to the CfP (Call for Proposal) of V-CG (Computer Graphics), Apple's proposal showed the highest objective/subjective performance. Accordingly, MPEG 3DGC (3D Graphic Compression) decided to determine a test model of V-CG at the next meeting based on Apple's proposal.

The basic concept of Apple's proposal is scalable mesh coding. Scalable mesh coding downsamples a dense mesh to become coarse, compresses the coarse mesh (base mesh) by using static mesh compression techniques, such as Google Draco and MPEG-AFX, and encodes a difference between a dense mesh and the base mesh based on a reconstructed base mesh. In addition, in MPEG-3DGC, the V-CG standard considers sharing the V3C (Volumetric Visual Video based Coding) standard. Therefore, Apple's proposal also converts most of the information of the mesh into a 2D UV domain image by using mapping and then compresses the mesh by using a video codec.

In the existing V-PCC/V3C, an encoder splits a 3D point cloud into multiple patches, maps each patch to a UV domain, and transmits the mapped information to a decoder. In Apple's proposal, the encoder generates a patch and maps the generated patch to the UV domain, but since the corresponding information includes UV coordinate information for each vertex, the encoder does not transmit the patch information separately. However, in order to share the V3C standard, it is expected that patch information will be added in the future standardization process. Therefore, when a mesh is encoded/decoded in patches, a method of utilizing patch information needs to be considered.

SUMMARY

The present disclosure seeks to provide a mesh coding method and device for splitting a base mesh into a plurality of patches and performs compression on a patch basis by using static mesh coding to improve coding efficiency for a 3D mesh.

In addition, the present disclosure seeks to provide a mesh coding method and device for converting vertex coordinates and UV coordinates of a base mesh into vertex coordinates and UV coordinates inside a patch by using bounding box (i.e., start and end coordinates) information in 3D space and UV space included in the patch information.

At least one aspect of the present disclosure provides a method of decoding a mesh, performed by a mesh decoding device. The method includes separating a bitstream into a base mesh bitstream, a transform-coefficient bitstream, and an attribute map bitstream. Here, the base mesh bitstream includes a patch bitstream and a sub-base mesh bitstream. The method also includes decoding the base mesh bitstream to reconstruct a base mesh including base mesh vertices and connectivity. The method also includes decoding the patch bitstream to reconstruct patch information. The patch information includes an offset and a size of each patch. The method also includes decoding the sub-base mesh bitstream to reconstruct a patch-based base mesh. The method also includes reconstructing the base mesh vertices and connectivity by using the patch information and the patch-based base mesh.

Another aspect of the present disclosure provides a method of encoding a mesh, performed by a mesh encoding device. The method includes acquiring original vertices and connectivity, and an original attribute map for the mesh. The method also includes encoding the original vertices and connectivity to generate a base mesh bitstream. The method also includes generating a reconstructed base mesh including reconstructed base mesh vertices and connectivity from the base mesh bitstream. The method also includes downsampling the original vertices and connectivity to generate a base mesh. Here, the base mesh includes base mesh vertices and connectivity. The method also includes classifying the base mesh into a plurality of patches by using the base mesh vertices and connectivity and generating patch information of each patch. The patch information includes an offset and a size of each patch. The method also includes subtracting the offset from position coordinate values of the base mesh vertices to generate differential base mesh vertices and connectivity.

Yet another aspect of the present disclosure provides a computer-readable recording medium storing a bitstream generated by a mesh encoding method. The mesh encoding method includes acquiring original vertices and connectivity, and an original attribute map for mesh. The mesh encoding method also includes encoding the original vertices and connectivity to generate a base mesh bitstream. The mesh encoding method also includes generating a reconstructed base mesh including reconstructed base mesh vertices and connectivity from the base mesh bitstream. The mesh encoding method also includes downsampling the original vertices and connectivity to generate a base mesh. Here, the base mesh includes base mesh vertices and connectivity. The mesh encoding method also includes classifying the base mesh into a plurality of patches using the base mesh vertices and connectivity and generating patch information of each patch. The patch information includes an offset and a size of each patch. The mesh encoding method also includes subtracting the offset from position coordinate values of the base mesh vertices to generate differential base mesh vertices and connectivity.

As described above, the present disclosure provides a mesh coding method and an apparatus for splitting a base mesh into a plurality of patches and performs compression on a patch basis by using static mesh coding. Thus, the mesh coding method and the apparatus improve coding efficiency for a 3D mesh.

In addition, according to the present embodiment, the present disclosure provides a mesh coding method and an apparatus for converting vertex coordinates and UV coordinates of a base mesh into vertex coordinates and UV coordinates inside a patch by using bounding box (i.e., start and end coordinates) information in 3D space and UV space included in the patch information. Thus, the mesh coding method and the apparatus improve coding efficiency for a 3D mesh according to reduction of a dynamic range of coordinate values.

DETAILED DESCRIPTION

Figure 1:
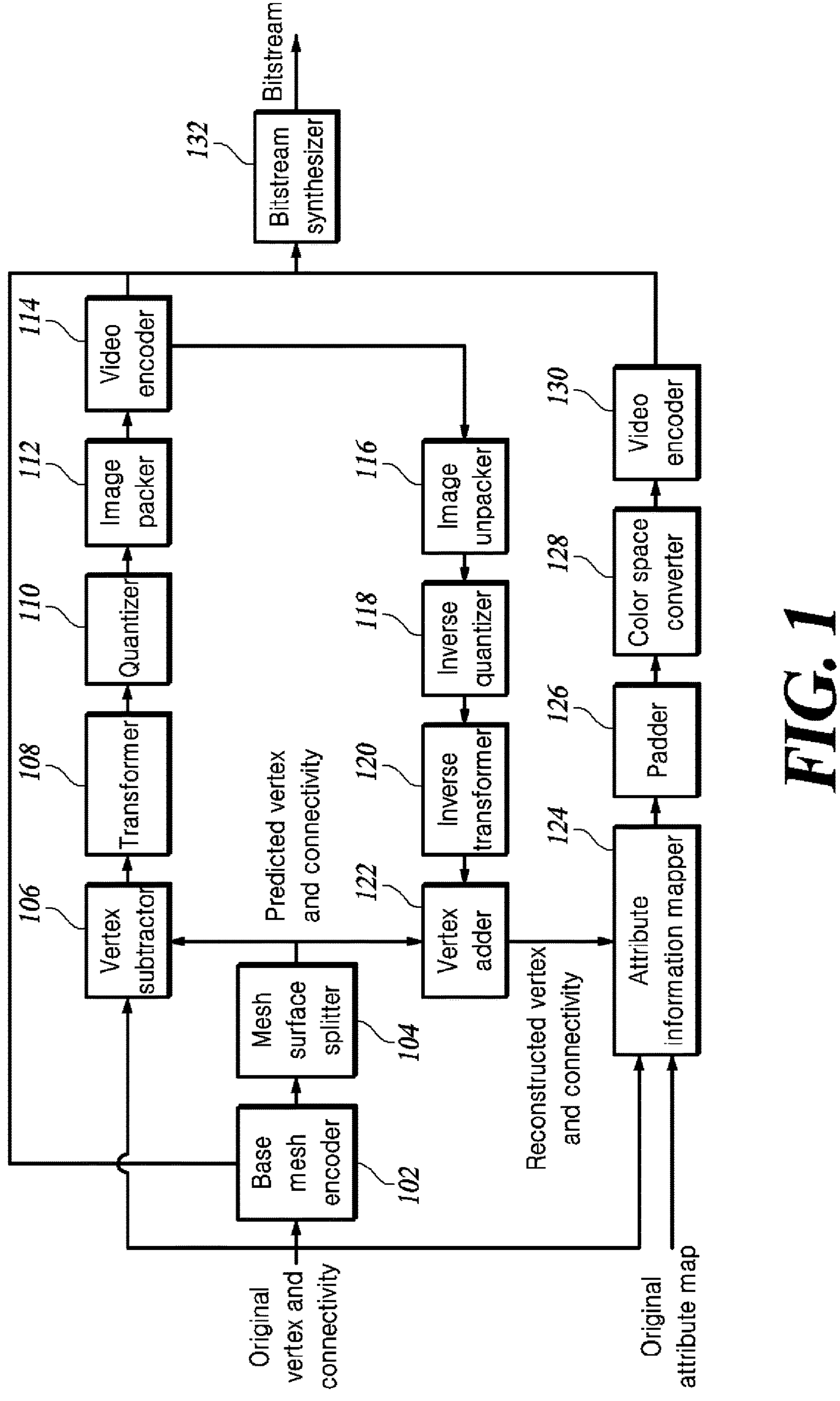
FIG. 1 is a block diagram illustrating a mesh encoding device according to an embodiment of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

The present embodiment discloses a method and a device for patch-based mesh coding. More specifically, the present embodiment provides a mesh coding method and device for splitting a base mesh into a plurality of patches and performs compression on a patch basis by using static mesh coding to improve coding efficiency for a 3D mesh. In addition, the present embodiment provides a mesh coding method and device for converting vertex coordinates and UV coordinates of a base mesh into vertex coordinates and UV coordinates inside a patch by using bounding box (i.e., start and end coordinates) information in 3D space and UV space included in the patch information.

FIG. 1 is a block diagram illustrating a mesh encoding device according to an embodiment of the present disclosure.

The mesh encoding device (hereinafter, used interchangeably with 'encoding device') encodes original vertices and connectivity, and an original attribute map for a mesh to generate a bitstream. Here, the vertices of the mesh may include coordinate values in a three-dimensional (3D) space and coordinate values in a two-dimensional (2D) UV domain. In addition, the connectivity of the mesh may be information representing a surface of the mesh as a set of vertices in a 3D space. In addition, the attribute map may be information representing an attribute value of a mesh surface.

The encoding device may include all or some of a base mesh encoder 102, a mesh surface splitter 104, a vertex subtractor 106, a transformer 108, a quantizer 110, an image packer 112, a video encoder 114 or 130, an image unpacker 116, an inverse quantizer 118, an inverse transformer 120, a vertex adder 122, an attribute information mapper 124, a padder 126, a color space converter 128, and a bitstream synthesizer 132.

Figure 2:
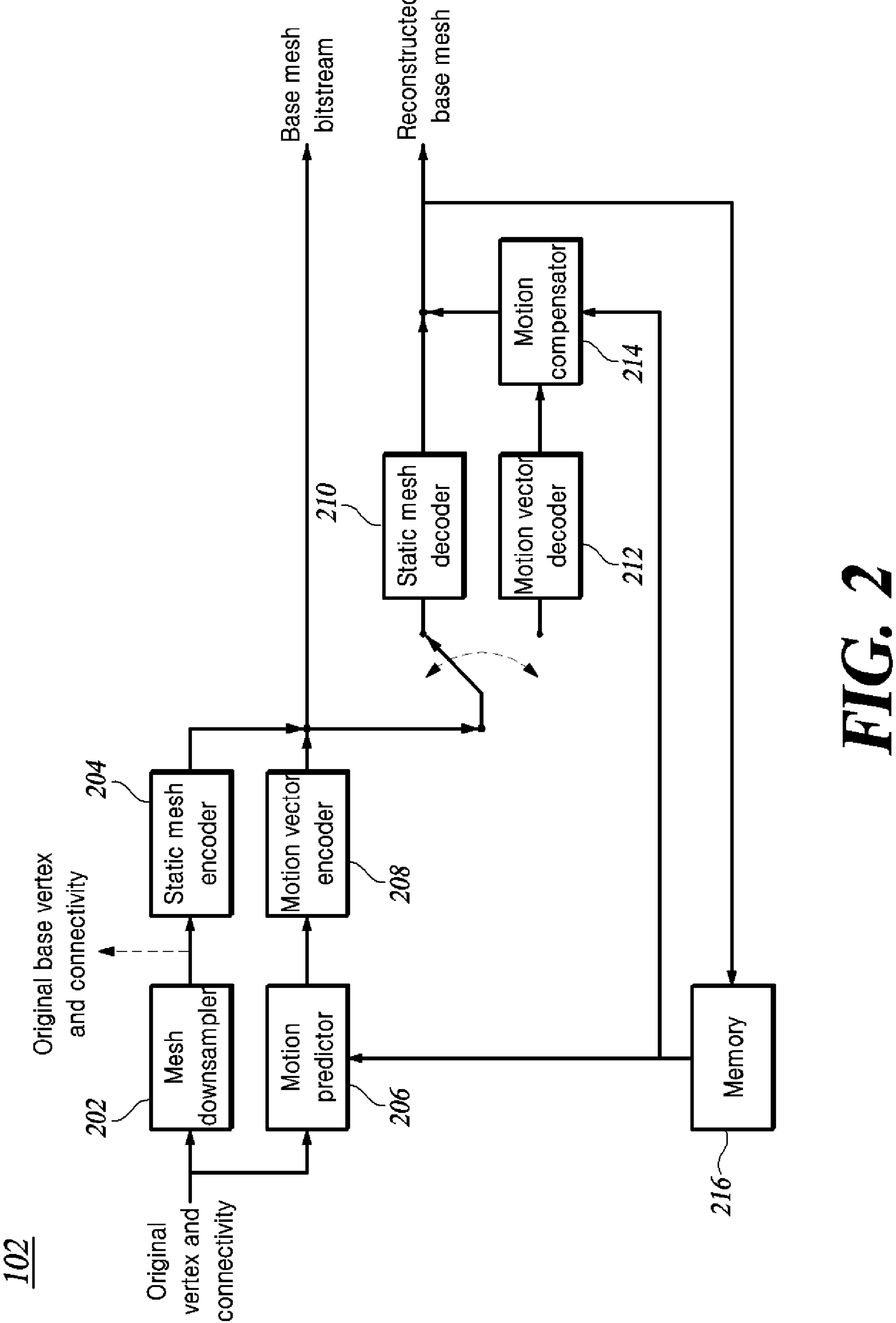
FIG. 2 is a block diagram illustrating a base mesh encoder according to an embodiment of the present disclosure.

FIG. 2 is a block diagram illustrating a base mesh encoder according to an embodiment of the present disclosure.

The base mesh encoder 102 may encode the received original vertices and connectivity to generate a base mesh bitstream and a reconstructed base mesh. The reconstructed base mesh represents the reconstructed base mesh vertices and connectivity. The base mesh bitstream may be transferred to the bitstream synthesizer 132. In addition, the reconstructed base mesh vertices and connectivity may be transferred to the mesh surface splitter 104. In addition, the reconstructed base mesh vertices and connectivity may be transferred to the attribute information mapper 124 together with a sub-vertex generated by the vertex adder 122.

Meanwhile, the base mesh vertices and connectivity correspond to geometric information of the base mesh. However, the base mesh encoder 102 targets only the geometric information of the base mesh. Hereinafter, encoding or decoding the base mesh means encoding or decoding the base mesh vertices and connectivity.

The base mesh encoder 102 may include all or some of a mesh downsampler 202, a static mesh encoder 204, a motion predictor 206, a motion vector encoder 208, a static mesh decoder 210, a motion vector decoder 212, a motion compensator 214, and a memory 216. Among the components of the base mesh encoder 102, the mesh downsampler 202, the static mesh encoder 204, and the static mesh decoder 210 directly encode or decode the base mesh. In addition, the motion predictor 206, the motion vector encoder 208, the motion vector decoder 212, and the motion compensator 214 encode or decode the base mesh using a motion vector.

The mesh downsampler 202 may receive original vertices and connectivity and may downsample the mesh to generate base mesh vertices and connectivity. The generated base mesh vertices and connectivity may be transferred to the static mesh encoder 204.

The static mesh encoder 204 may encode the inputted base mesh vertices and connectivity to generate a base mesh bitstream. The static mesh encoder 204 may encode the base mesh by using a static mesh encoding method, such as Google Draco or MPEG-AFX. The generated bitstream may be outputted from the base mesh encoder 102. In addition, the bitstream may be transferred to the static mesh decoder 210.

The static mesh decoder 210 may decode the inputted base mesh bitstream to reconstruct the base mesh vertices and connectivity. The reconstructed base mesh vertices and connectivity may be outputted from the base mesh encoder 102. In addition, the reconstructed base mesh vertices and connectivity may be transferred to the memory 216 for subsequent frame encoding.

The motion predictor 206 may perform motion prediction based on the inputted original vertices and connectivity and the reconstructed base mesh vertices and connectivity of the previous frame stored in the memory 216 to generate a motion vector. The generated motion vector may be transferred to the motion vector encoder 208.

The motion vector encoder 208 may encode the inputted motion vector to generate a base mesh bitstream. The generated bitstream may be outputted from the base mesh encoder 102. In addition, the bitstream may be transferred to the motion vector decoder 212.

The motion vector decoder 212 may decode the inputted base mesh bitstream to reconstruct the motion vector. The reconstructed motion vector may be transferred to the motion compensator 214.

The motion compensator 214 may compensate for the motion of the base mesh vertices of the previous frame received from the memory 216 by using the motion vector received from the motion vector decoder 212 to generate the base mesh of the current frame. The reconstructed base mesh may be outputted from the base mesh encoder 102. In addition, the reconstructed base mesh vertices and connectivity may be transferred to the memory 216 for the next frame encoding.

The memory 216 may store the inputted reconstructed base mesh. The memory 216 may transfer the reconstructed base mesh to the motion predictor 206 for the next frame encoding. In addition, the memory 216 may transfer the reconstructed base mesh to the motion compensator 214 for the next frame decoding.

Figure 3:
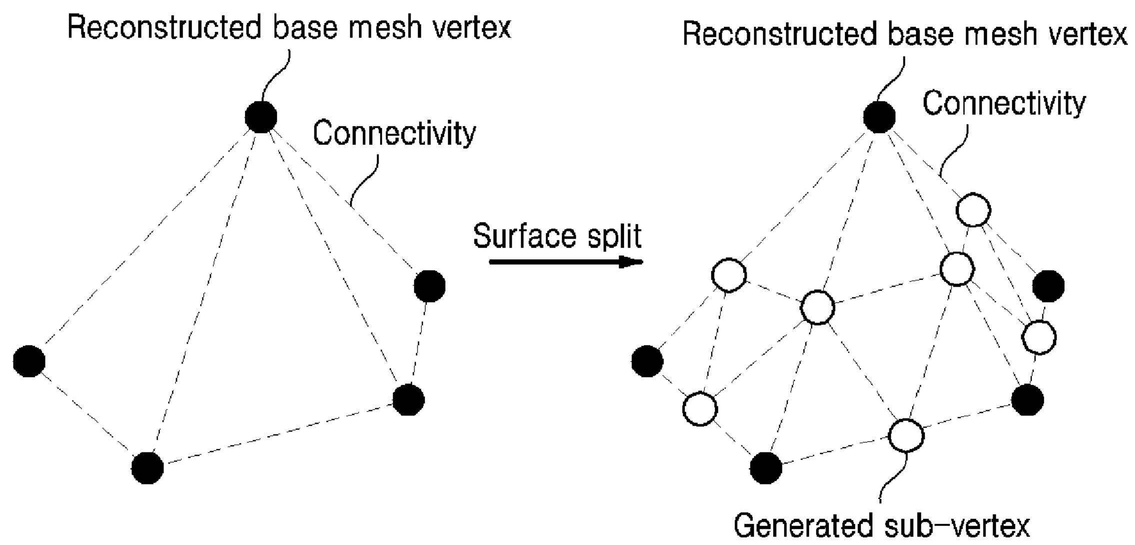
FIG. 3 is a diagram illustrating an operation of a mesh surface splitter according to an embodiment of the present disclosure.

FIG. 3 is a diagram illustrating an operation of the mesh surface splitter according to an embodiment of the present disclosure.

The mesh surface splitter 104 may perform surface split by receiving reconstructed base mesh vertices and connectivity to generate sub-vertices. In addition, connectivity may be generated to connect the generated sub-vertices to existing base mesh vertices. As an example, as in the example of FIG. 3, the surface splitting method may generate a sub-vertex in the middle of two reconstructed basic vertices that are connected to each other to split one triangular face into four triangular faces. As another example, the surface splitting method may generate a vertex at one of three edges to split one triangular face into two triangular faces. The generated sub-vertices may become predicted vertices together with the reconstructed base mesh vertices. The predicted vertices and connectivity may be transferred to the vertex subtractor 106 and the vertex adder 122.

Figure 4:
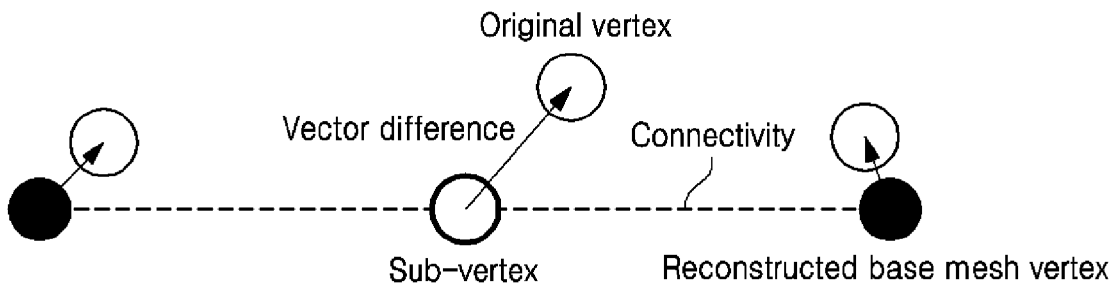
FIG. 4 is a diagram illustrating an operation of a vertex subtractor according to an embodiment of the present disclosure.

FIG. 4 is a diagram illustrating an operation of a vertex subtractor according to an embodiment of the present disclosure.

The vertex subtractor 106 may receive an original vertex and connectivity and predicted vertex and connectivity and subtract the predicted vertex from the original vertex to generate a vector difference, as in the example of FIG. 4. The generated vector difference and connectivity may be transferred to the transformer 108.

The transformer 108 may perform a transform on the inputted vector differences to generate transform-coefficients and may transfer the generated transform-coefficients to the quantizer 110. Here, wavelet transform may be used as the transform method. In addition, lifting transform, which is a type of wavelet transform, may be used. Here, the connectivity of the vector differences may be used for the wavelet transform.

The quantizer 110 may quantize the inputted transform-coefficients to generate quantized transform-coefficients and may transfer the generated quantized transform-coefficients to the image packer 112.

Figure 5:
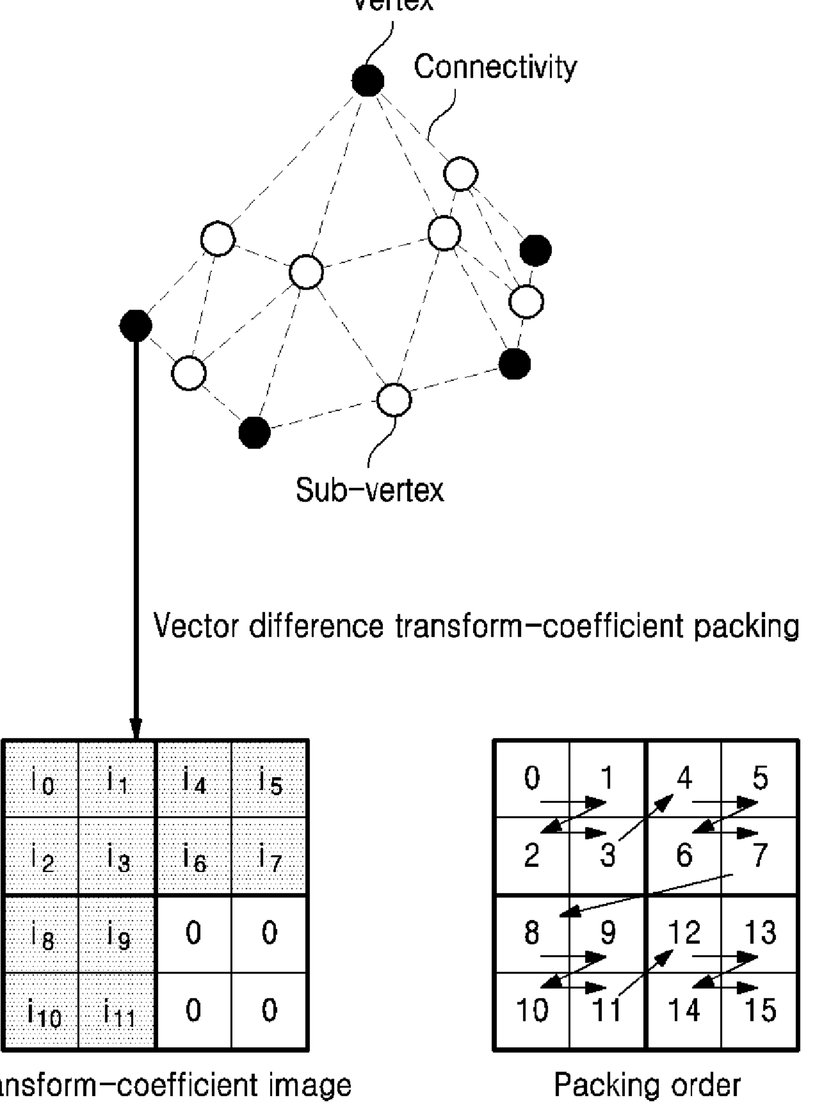
FIG. 5 is a diagram illustrating an operation of an image packer according to an embodiment of the present disclosure.

FIG. 5 is a diagram illustrating an operation of the image packer according to an embodiment of the present disclosure.

The image packer 112 may pack inputted transform-coefficients into a 2D space to generate a transform-coefficient image. For example, the transform-coefficients may be packed on a M×N block basis according to a raster scan order. In the example of FIG. 5, the transform-coefficients are packed by raster scan order on a 2×2 block basis. Alternatively, various scanning methods, such as a vertical scan, a horizontal scan, a diagonal zig-zag scan, or the like may be used. The block size and the scanning method may be transferred to a mesh decoding device (hereinafter, used interchangeably with a 'decoding device') while being included in the bitstream. Meanwhile, the generated transform-coefficient image may be transferred to a video encoder 114.

The video encoder 114 may encode the inputted transform-coefficient image to generate a transform-coefficient bitstream. In addition, the video encoder 114 may generate a reconstructed transform-coefficient image from the transform-coefficient bitstream. Here, the video encoder 114 may use various related art video coding technologies, such as H.264/AVC (Advanced Video Coding), H.265/HEVC (High Efficiency Video Coding), H.266/VVC (Versatile Video Coding), EVC, VP9, AV1, AVS2, or the like. The generated bitstream may be transferred to the bitstream synthesizer 132. In addition, the reconstructed transform-coefficient image may be transferred to the image unpacker 116.

The image unpacker 116 may obtain quantized transform-coefficients of vertices from the inputted transformed coefficient image. Here, the block size and scan method used in the image packer 112 may be used. The quantized transform-coefficients may be transferred to the inverse quantizer 118.

The inverse quantizer 118 may inversely quantize the inputted quantized transform-coefficients to reconstruct the transform-coefficients. The reconstructed transform-coefficients may be transferred to the inverse transformer 120.

The inverse transformer 120 may inversely transform the inputted transform-coefficients to reconstruct a vector difference of the vertex. The reconstructed vector difference may be transferred to the vertex adder 122.

The vertex adder 122 may reconstruct the vertices by adding the inputted predicted vertices and reconstructed vector differences. The reconstructed vertices and connectivity may be transferred to the attribute information mapper 124. As described above, since the predicted vertices include the reconstructed base mesh vertices and sub-vertices, the reconstructed vertices may also correspond to the reconstructed base mesh vertices and sub-vertices.

The attribute information mapper 124 may receive the original vertices and connectivity; the reconstructed vertices and connectivity; and the original attribute map and may correct the attribute information. Thereafter, the attribute information mapper 124 may map the corrected attribute information to a 2D UV space to generate a corrected attribute map. The corrected attribute map may be transferred to the padder 126.

The padder 126 may perform padding on the inputted corrected attribute map. Here, a push-pull padding method may be used as a padding method. Alternatively, a nearest padding method may be used. The padded attribute map may be transferred to the color space converter 128.

Here, the push-pull padding method hierarchically performs down-sampling on a target frame (the attribute map in this disclosure), hierarchically performs up-sampling, and then combines a foreground region of the same layer and an up-sampled background region. The push-pull padding method may improve the video coding efficiency by smoothing an edge region caused by a foreground texture packed on a patch basis.

The color space converter 128 may perform color space conversion on the inputted padded attribute map. Here, information on the color space conversion may be transferred to the decoding device while being included in the bitstream. The attribute map whose color space has been converted may be transferred to the video encoder 130.

The video encoder 130 may encode the inputted attribute map to generate an attribute map bitstream. The generated bitstream may be transferred to the bitstream synthesizer 132.

The bitstream synthesizer 132 connects all inputted bitstreams (i.e., the base mesh bitstream, the transform-coefficient bitstream, and the attribute map bitstream) to generate one bitstream. The synthesized bitstream may be outputted from the encoding device.

Figure 6:
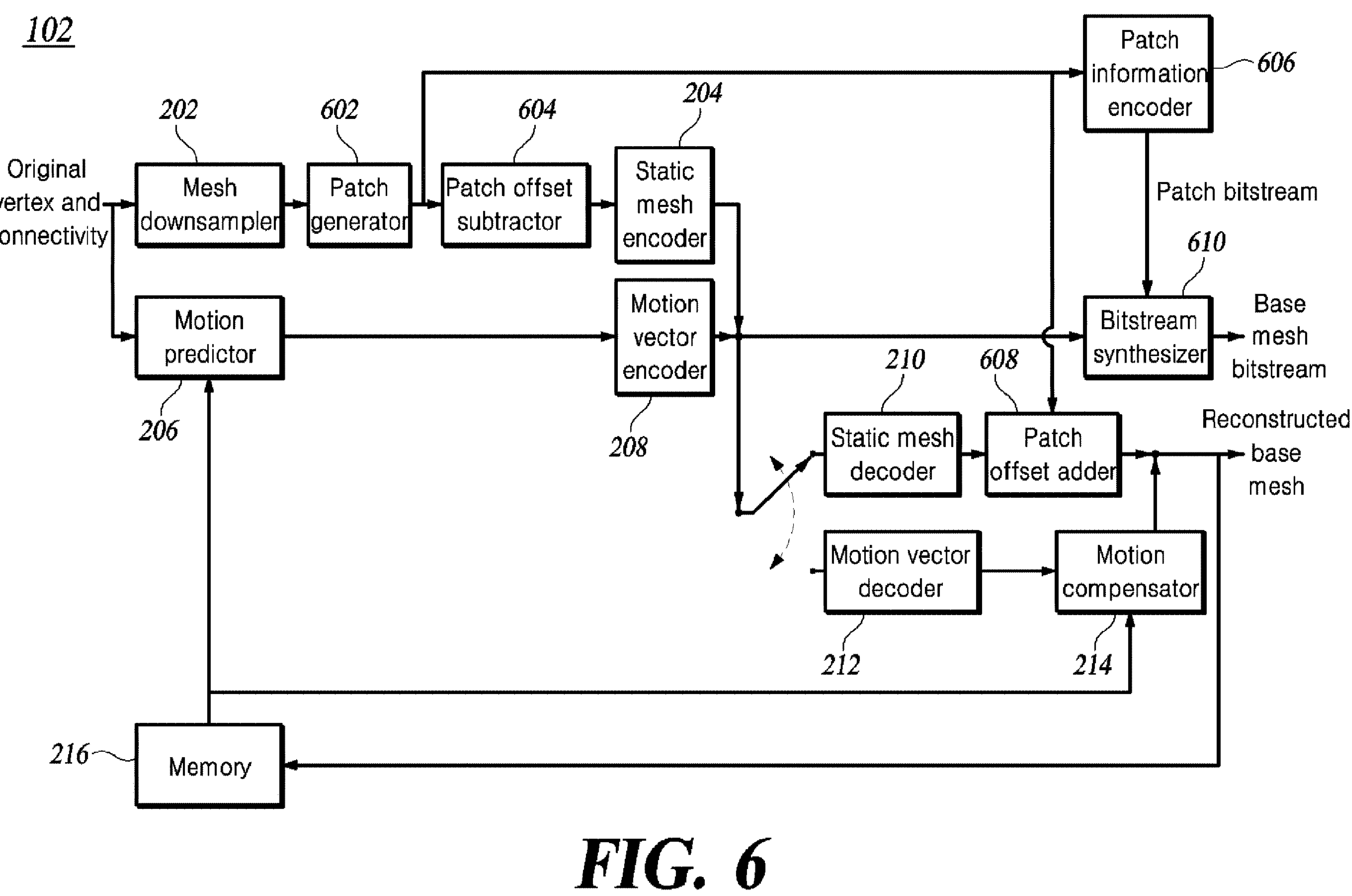
FIG. 6 is a diagram illustrating a base mesh encoder according to another embodiment of the present disclosure.

FIG. 6 is a diagram illustrating a base mesh encoder according to another embodiment of the present disclosure.

As described above, the base mesh encoder 102 may encode inputted original vertices and connectivity to generate a base mesh bitstream and a reconstructed base mesh. The base mesh encoder 102 may include all or some of a mesh downsampler 202, a patch generator 602, a patch offset subtractor 604, a static mesh encoder 204, a patch information encoder 606, a motion predictor 206, a motion vector encoder 208, a patch offset adder 608, a motion vector decoder 212, a motion compensator 214, a memory 216, and a bitstream synthesizer 610.

Among the components of the base mesh encoder 102, the mesh downsampler 202, the patch generator 602, the patch offset subtractor 604, the static mesh encoder 204, the static mesh decoder 210, the patch information encoder 606, and the patch offset adder 608 encode or decode the base mesh by using a patch. In addition, the motion predictor 206, the motion vector encoder 208, the motion vector decoder 212, and the motion compensator 214 encode or decode the base mesh by using the motion vector.

The mesh downsampler 202 may receive original vertices and connectivity and may downsample the mesh to generate base mesh vertices and connectivity. The generated base mesh vertices and connectivity may be transferred to the patch generator 602.

Figure 7:
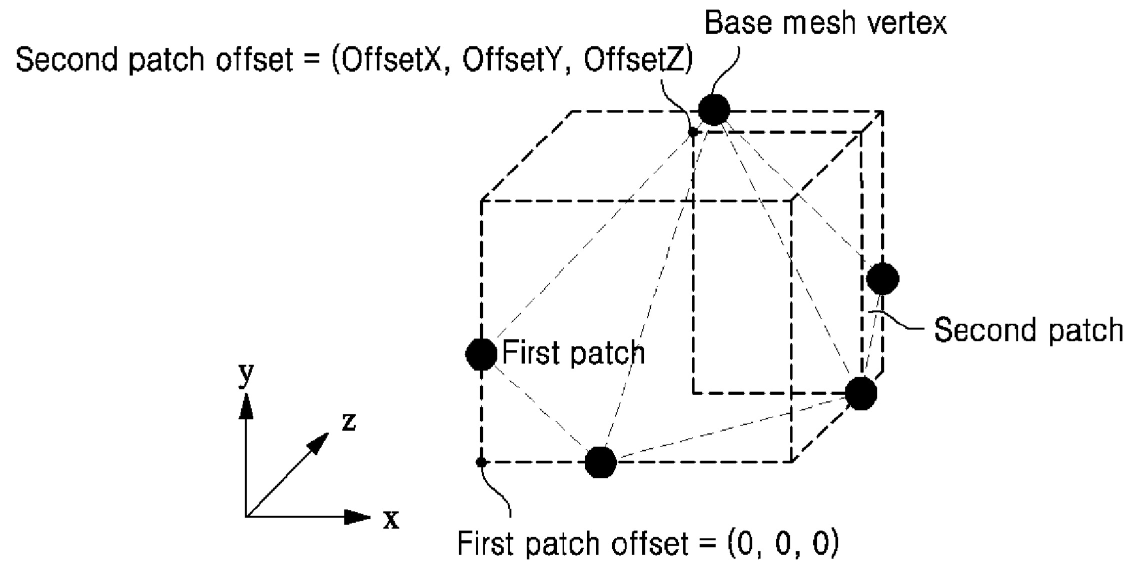
FIG. 7 is a diagram illustrating an operation of a patch generator according to an embodiment of the present disclosure.
Figure 7:
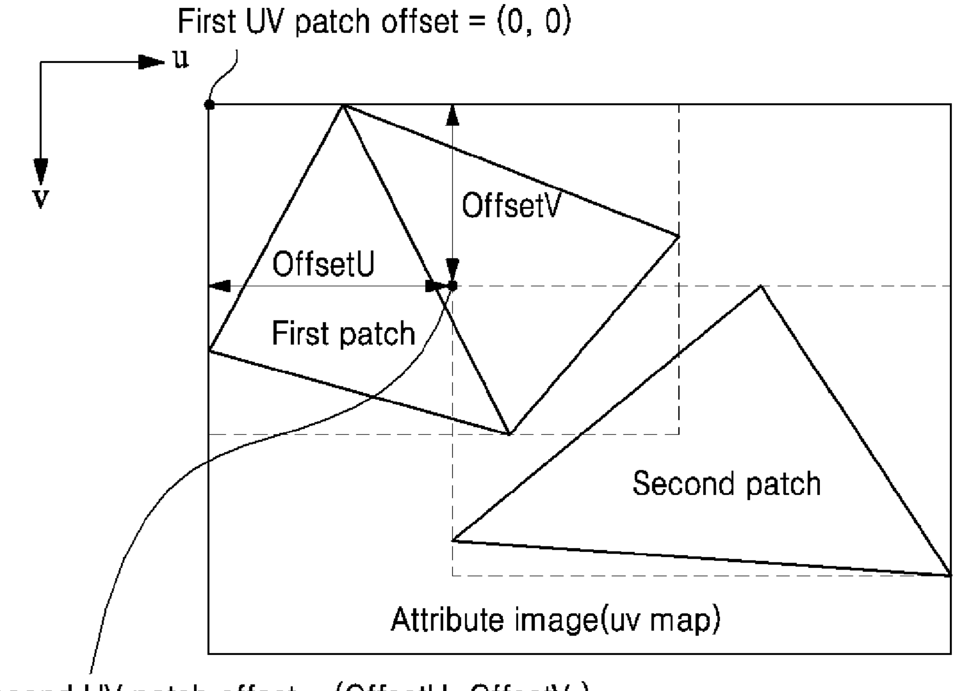

FIG. 7 is a diagram illustrating an operation of the patch generator according to an embodiment of the present disclosure.

The patch generator 602 may classify the base mesh into a plurality of patches by using the inputted base mesh vertices and connectivity. As in the example of FIG. 7, the patch generator 602 may generate patch information including a starting position (i.e., patch offset) and size of each patch by using the generated patches. In addition, as in the example of FIG. 7, the patch information may include 2D space (UV space) patch information and 3D space patch information. The generated patch information may be transferred to the patch offset subtractor 604, the patch information encoder 606, and the patch offset adder 608.

The patch information encoder 606 may encode the inputted patch information to generate a patch bitstream. The generated patch bitstream may be transferred to the bitstream synthesizer 610.

The patch offset subtractor 604 may correct the coordinate values of the base mesh vertices by subtracting the patch offset from the position coordinate values of the base mesh vertices using the inputted patch information. Here, the patch offset may be a coordinate value of a starting position of a patch bounding box. The differential base mesh vertices and connectivity may be transferred to the static mesh encoder 204.

The static mesh encoder 204 may encode the inputted differential base mesh vertices and connectivity to generate a sub-base mesh bitstream. Here, the static mesh encoder 204 may encode the differential base mesh by using a static mesh encoding method, such as Google Draco or MPEG-AFX. The generated bitstream may be outputted from the base mesh encoder 102. In addition, the bitstream may be transferred to the static mesh decoder 210.

The static mesh decoder 210 may decode the inputted sub-base mesh bitstream to reconstruct the differential base mesh vertices and connectivity. The reconstructed differential base mesh vertices and connectivity may be transferred to the patch offset adder 608.

The patch offset adder 608 may receive the reconstructed differential base mesh vertices and connectivity, and patch information. The patch offset adder 608 may reconstruct base mesh vertices by adding the inputted reconstructed differential base mesh vertices and an offset. Here, the offset may be a coordinate value of the start position of the patch included in the patch information. The reconstructed base mesh vertices and connectivity may be outputted from the base mesh encoder 102. In addition, the reconstructed base mesh vertices and connectivity may be transferred to the memory 216 for subsequent frame encoding.

The motion predictor 206 may perform motion prediction based on the inputted original vertices and connectivity and the reconstructed base mesh vertices and connectivity of the previous frame stored in the memory 216 to generate a motion vector. The generated motion vector may be transferred to the motion vector encoder 208.

The motion vector encoder 208 may encode the inputted motion vector to generate a sub-base mesh bitstream. The generated bitstream may be transferred to the bitstream synthesizer 610. In addition, the bitstream may be transferred to the motion vector decoder 212.

The motion vector decoder 212 may decode the inputted bitstream to reconstruct the motion vector. The reconstructed motion vector may be transferred to the motion compensator 214.

The motion compensator 214 may compensate for the motion of the base mesh vertices of the previous frame transferred from the memory 216 by using the motion vector transferred from the motion vector decoder 214 to generate the base mesh of the current frame. The reconstructed base mesh may be outputted from the base mesh encoder 102. In addition, the reconstructed base mesh vertices and connectivity may be transferred to the memory 216 for the next frame encoding.

The memory 216 may store the inputted reconstructed base mesh. The memory 216 may transfer the reconstructed base mesh to the motion predictor 206 for subsequent frame encoding. In addition, the memory 216 may transfer the reconstructed base mesh to the motion compensator 214 for subsequent frame decoding.

The bitstream synthesizer 610 may connect all the received bitstreams (i.e., patch bitstreams and sub-base mesh bitstreams) to generate a base mesh bitstream. The generated base mesh bitstream may be outputted from the base mesh encoder 102.

Figure 8:
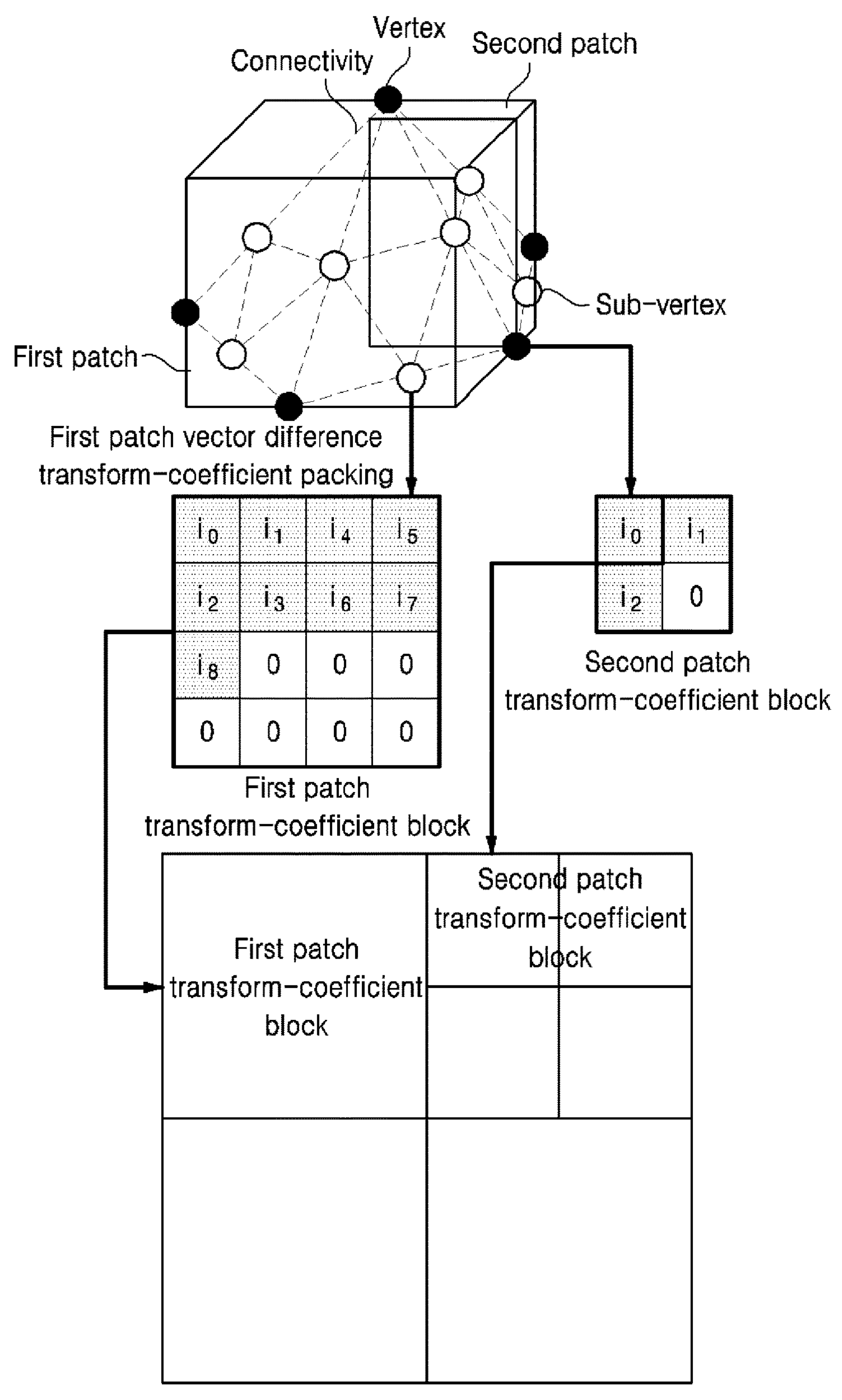
FIG. 8 is a diagram illustrating an operation of an image packer according to an embodiment of the present disclosure.

FIG. 8 is a diagram illustrating an operation of the image packer according to an embodiment of the present disclosure.

The image packer 112 in the encoding device may pack the transform-coefficients received on a patch basis in order of 2D blocks. Here, the block size may be determined based on preset horizontal and vertical sizes. Alternatively, the block size may be determined based on the number of transform-coefficients included in the patch. Information related to the block may be entropy-encoded and then may be transferred to the decoding device.

In the example of FIG. 8, the image packer 112 determines the size of a square block based on the number of transform-coefficients included in each patch. The image packer 112 may pack the transform-coefficients into the determined block in the scan order. If the number of transform-coefficients packed into one block is smaller than an internal area of the block, the image packer 112 may fill all the empty spaces with 0. Alternatively, the empty spaces may be padded with an intermediate value of a bit depth used by the video encoder 114. Alternatively, the empty spaces may be padded with the nearest transform-coefficient.

In the example of FIG. 8, the image packer 112 packs the transform-coefficients according to the raster scan order on a block basis. Various methods may be used for the scan order, and the scan order information may be entropy-encoded and then may be transferred to the decoding device. As described above, blocks of different sizes may be determined based on the number of transform-coefficients included in the patch, as in the example of FIG. 8. In order to effectively pack blocks of different sizes into a 2D image, the transform-coefficients may be packed in the form of a quad tree, as in the example on the right side of FIG. 8. Alternatively, various tree methods, such as binary trees, ternary trees, or the like may be used. The used tree information may be included in the bitstream and may be transferred to the decoding device.

Figure 9:
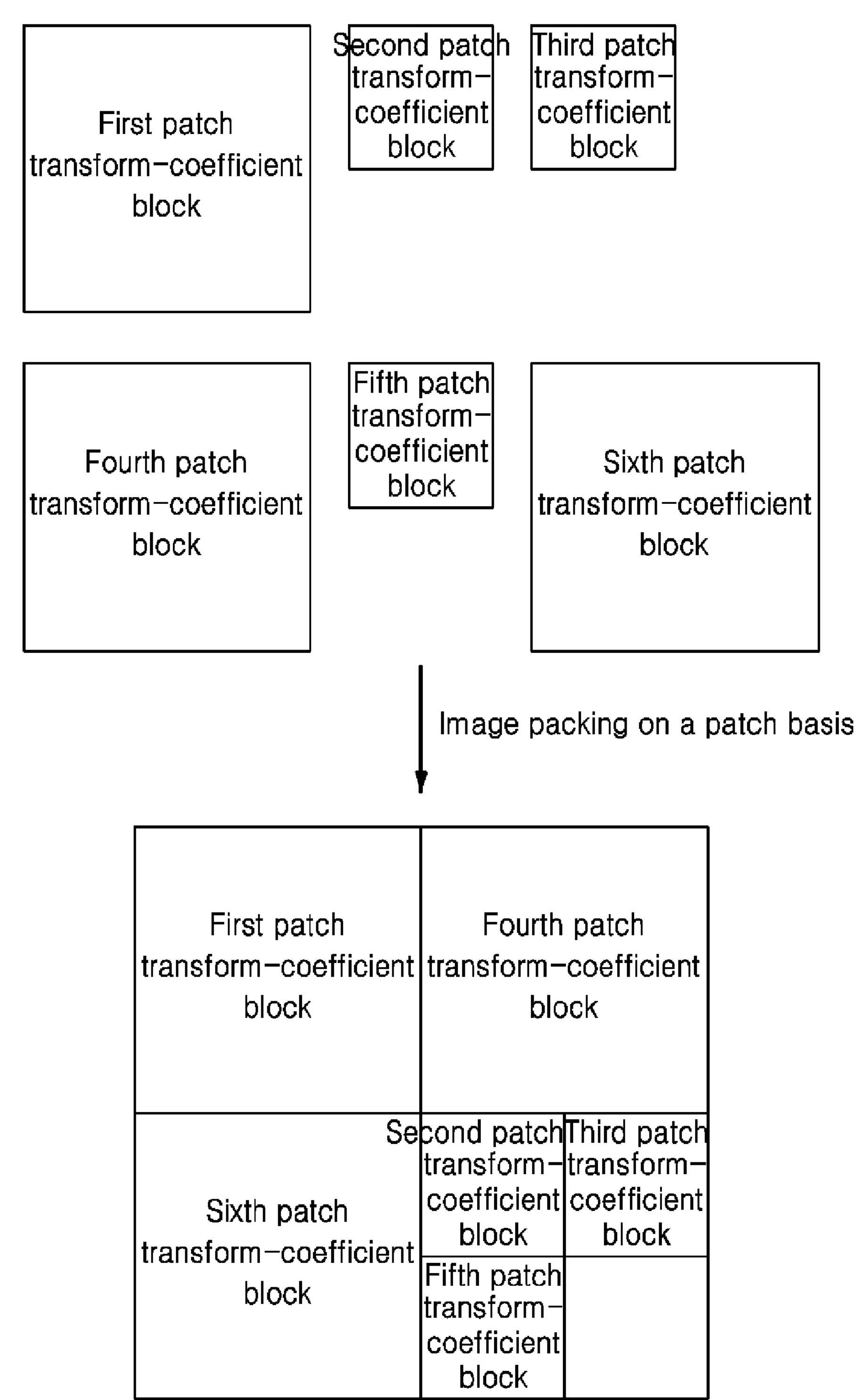
FIG. 9 is a diagram illustrating image packing on a patch basis according to an embodiment of the present disclosure.

In addition, when a plurality of blocks are generated as shown in FIG. 9, the image packer 112 may pack a plurality of blocks with the packing order changed according to the block size. The image packer 112 may first pack blocks of the same size in order, may increase a quadtree depth by one, and then may pack blocks of the next smaller size.

In addition, the quantizer 112 may adjust the degree of quantization of the transform-coefficient by using different quantization parameters on a path basis. In addition, the encoding device may transmit the corresponding quantization parameter information to the video encoder 114 and may encode a transform-coefficient image based on the transferred quantization parameter, thereby performing video encoding more efficiently. In general, the video encoder 114 transmits the quantization parameter on a block basis. Therefore, the encoding device may perform more accurate bit rate adjustment by using the quantization parameter information on a patch basis. In addition, by performing block split at high speed by using patch information in the video encoder 114, the complexity of the encoding device may be reduced. As described above, the generated transform-coefficient image may be transferred to the video encoder 114.

The mesh encoding device may store the bitstream of the encoded mesh data in a non-transitory recording medium or transmit the bitstream to the mesh decoding device by using a communication network.

Figure 10:
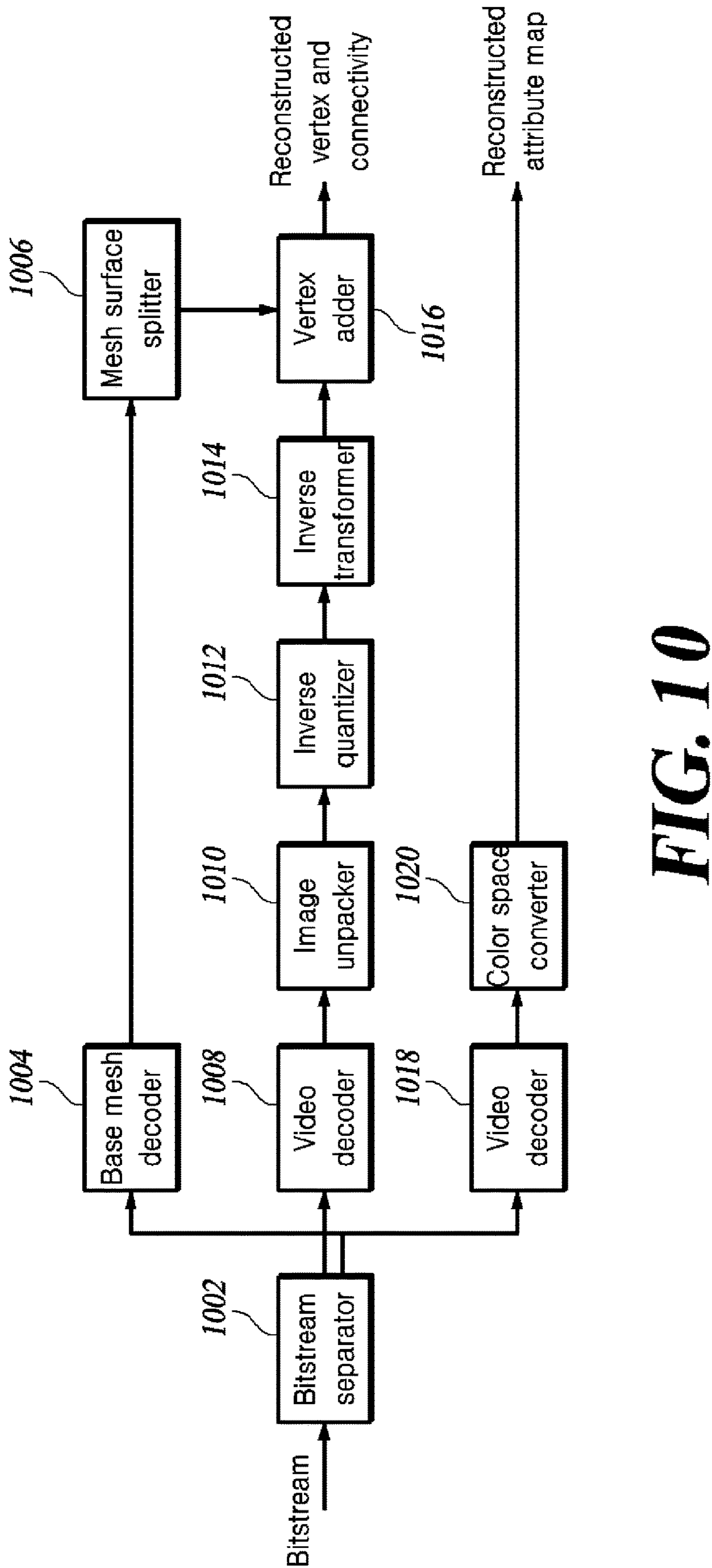
FIG. 10 is a diagram illustrating a mesh decoding device according to an embodiment of the present disclosure.

FIG. 10 is a diagram illustrating a mesh decoding device according to an embodiment of the present disclosure.

The mesh decoding device (i.e., the 'decoding device') may decode the inputted bitstream to generate reconstructed vertices, connectivity, and attribute maps to reconstruct the mesh. The decoding device may include all or some of a bitstream separator 1002, a base mesh decoder 1004, a mesh surface splitter 1006, video decoders 1008 and 1018, an image unpacker 1010, an inverse quantizer 1012, an inverse transformer 1014, a vertex adder 1016, and a color space converter 1020.

The bitstream separator 1002 may separate an inputted bitstream to generate a base mesh bitstream, a transform-coefficient bitstream, and an attribute map bitstream. The base mesh bitstream may be transferred to the base mesh decoder 1004. The transform-coefficient bitstream and the attribute map bitstream may be transferred to the video decoders 1006 and 1018, respectively. Here, each bitstream may be inputted to a separate video decoder. Or, each bitstream may be inputted continuously to one video decoder.

Figure 11:
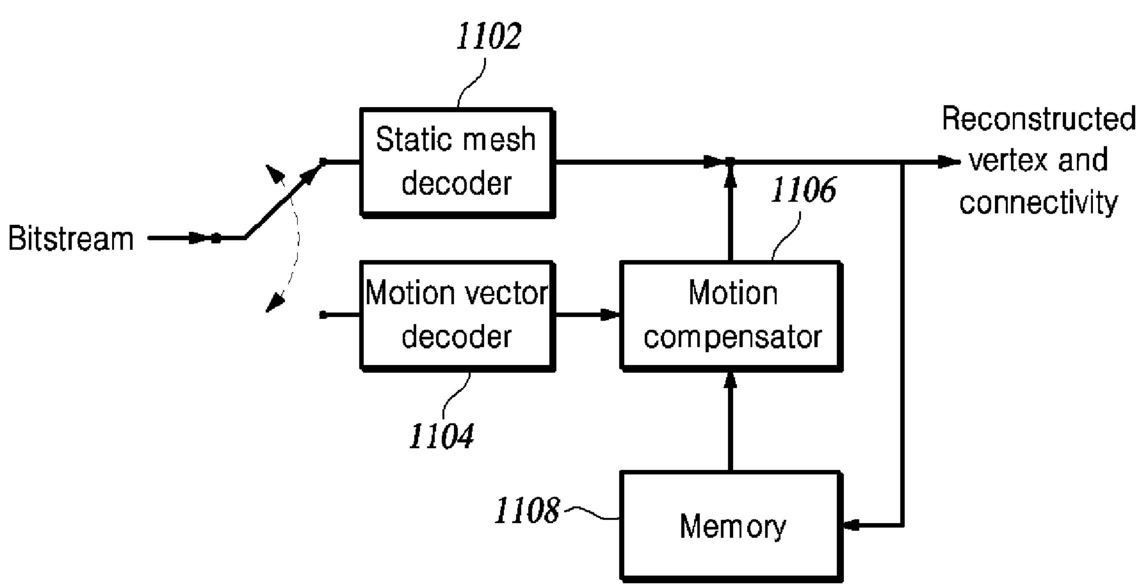
FIG. 11 is a block diagram illustrating a base mesh decoder according to an embodiment of the present disclosure.

FIG. 11 is a block diagram illustrating a base mesh decoder according to an embodiment of the present disclosure.

The base mesh decoder 1004 may decode the inputted base mesh bitstream to generate a reconstructed base mesh. The reconstructed base mesh represents reconstructed base mesh vertices and connectivity. The base mesh decoder 1004 may include all or some of the static mesh decoder 1102, the motion vector decoder 1104, the motion compensator 1106, and the memory 1108.

Meanwhile, the base mesh vertices and connectivity correspond to the geometric information of the base mesh. However, the base mesh decoder 1004 targets only the geometric information of the base mesh. Hereinafter, decoding the base mesh refers to decoding the base mesh vertices and connectivity.

Among the components of the base mesh decoder 1004, the static mesh decoder 1102 directly decodes the base mesh. In addition, the motion vector decoder 1104 and the motion compensator 1106 decode the base mesh by using the motion vector.

The static mesh decoder 1102 may decode the inputted bitstream to reconstruct the base mesh vertices and connectivity. The reconstructed base mesh vertices and connectivity may be transferred from the base mesh decoder 1004 to the mesh surface splitter 1006. In addition, the reconstructed base mesh vertices and connectivity may be transferred to the memory 1108 for subsequent frame encoding.

The motion vector decoder 1104 may decode the inputted bitstream to reconstruct the motion vector. The reconstructed motion vector may be transferred to the motion compensator 1106.

The motion compensator 1106 may compensate for the motion of the base mesh vertices of the previous frame received from the memory 1108 by using the motion vector received from the motion vector decoder 1104 to generate the base mesh of the current frame. The reconstructed base mesh may be outputted from the base mesh decoder 1004. In addition, the reconstructed base mesh vertices and connectivity may be transferred to the memory 1108 for encoding the next frame.

The memory 1108 may store the inputted reconstructed base mesh. In addition, the memory 1108 may transfer the reconstructed base mesh to the motion compensator 1106 for subsequent frame decoding.

Figure 12:
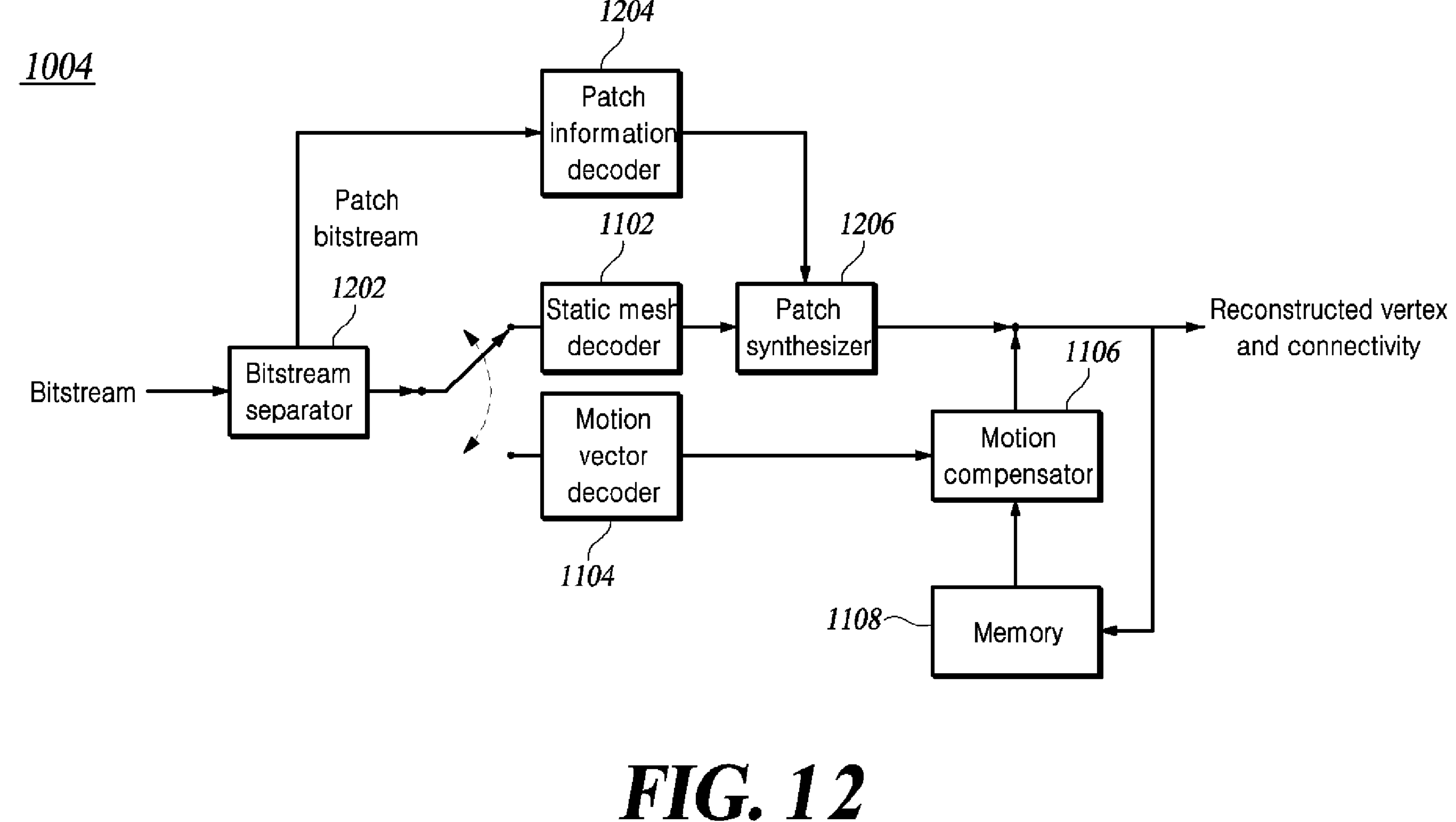
FIG. 12 is a block diagram illustrating a base mesh decoder according to another embodiment of the present disclosure.

FIG. 12 is a block diagram illustrating a base mesh decoder according to another embodiment of the present disclosure.

As described above, the base mesh decoder 1004 may decode the inputted base mesh bitstream to generate the reconstructed base mesh. The base mesh decoder 1004 may include all or some of a bitstream separator 1202, a patch information decoder 1204, the static mesh decoder 1102, a patch synthesizer 1206, the motion vector decoder 1104, the motion compensator 1106, and the memory 1108. Among the components of the base mesh decoder 1004, the patch information decoder 1204, the static mesh decoder 1102, and the patch synthesizer 1206 decode the base mesh by using the patch. In addition, the motion vector decoder 1104 and the motion compensator 1106 decode the base mesh by using the motion vector.

The bitstream separator 1202 may separate the inputted base mesh bitstream to generate a patch bitstream and a sub-base mesh bitstream. The patch bitstream may be transferred to the patch information decoder 1204. The sub-base mesh bitstream may be transferred to the static mesh decoder 1102 or the motion vector decoder 1102.

The patch information decoder 1204 may decode the inputted patch bitstream to reconstruct the patch information. As described above, the patch information may include 2D space (UV space) patch information and 3D space patch information. In addition, the patch information includes the offset (i.e., a start position) and the size of each patch. The reconstructed patch information may be transferred to the patch synthesizer 1206.

The static mesh decoder 1102 may decode the inputted sub-base mesh bitstream to reconstruct the patch-based base mesh. The reconstructed patch-based base mesh may be transferred to the patch synthesizer 1206.

The patch synthesizer 1206 may generate a reconstructed base mesh by using the inputted patch information and the reconstructed patch-based base mesh. The patch synthesizer 1206 may first correct mesh vertex information by adding the offset reconstructed on a path basis to the vertex information of the base mesh by using the patch information. Thereafter, the patch synthesizer 1206 may reconstruct the base mesh by collecting the corrected patches in the same space. The reconstructed base mesh vertices and connectivity may be outputted from the base mesh decoder 1004. In addition, the reconstructed base mesh vertices and connectivity may be transferred to the memory 1108 for subsequent frame encoding.

The motion vector decoder 1104 may decode the inputted sub-base mesh bitstream to reconstruct the motion vector. The reconstructed motion vector may be transferred to the motion compensator 1106.

The motion compensator 1106 may compensate for the motion of the base mesh vertices of the previous frame received from the memory 1108 by using the motion vector received from the motion vector decoder 1104 to generate the base mesh of the current frame. The reconstructed base mesh may be outputted from the base mesh decoder 1004. In addition, the reconstructed base mesh vertices and connectivity may be transferred to the memory 1108 for encoding the next frame.

The memory 1108 may store the inputted reconstructed base mesh. In addition, the memory 1108 may transfer the reconstructed base mesh to the motion compensator 1106 for subsequent frame decoding.

In the example of FIG. 10, the mesh surface splitter 1006 may receive the reconstructed base mesh vertices and connectivity and perform surface split to generate sub-vertices. In addition, the mesh surface splitter 1006 may generate connectivity connecting the generated sub-vertices and the existing base mesh vertices. The generated sub-vertices may become predicted vertices together with the reconstructed base mesh vertices. The predicted vertices and connectivity may be transferred to the vertex adder 1016.

The video decoder 1008 may decode the inputted transform-coefficient bitstream to reconstruct the transform-coefficient image. The reconstructed transform-coefficient image may be transferred to the image unpacker 1010.

The image unpacker 1010 may generate quantized transform-coefficients of the vertices from the inputted transform-coefficient image. Here, the block size and scan method used in the image packer 112 may be used. The quantized transform-coefficients may be transferred to the inverse quantizer 1012.

The inverse quantizer 1012 may inversely quantize the inputted quantized transform-coefficients to reconstruct the transform-coefficients. The reconstructed transform-coefficients may be transferred to the inverse transformer 1014.

The inverse transformer 1014 may inversely transform the inputted transform-coefficients to reconstruct the vector difference of the vertex. The reconstructed vector difference may be transferred to the vertex adder 1016.

The vertex adder 1016 may add the inputted predicted vertex and the reconstructed vector difference to reconstruct the vertex. The reconstructed vertex and connectivity may be outputted from the decoding device. As described above, since the predicted vertex includes the reconstructed base mesh vertex and sub-vertex, the reconstructed vertex may also correspond to the reconstructed base mesh vertex and sub-vertex.

The video decoder 1018 may decode the inputted attribute map bitstream to reconstruct the attribute map. The reconstructed attribute map may be transferred to the color space converter 1020.

The color space converter 1020 may convert the inputted reconstructed attribute map into a color space of the same attribute map as the original mesh. The attribute map whose color space is converted may be outputted from the decoding device.

Hereinafter, a method of encoding and decoding a mesh is described using the illustrations of FIGS. 13 to 16.

Figure 13:
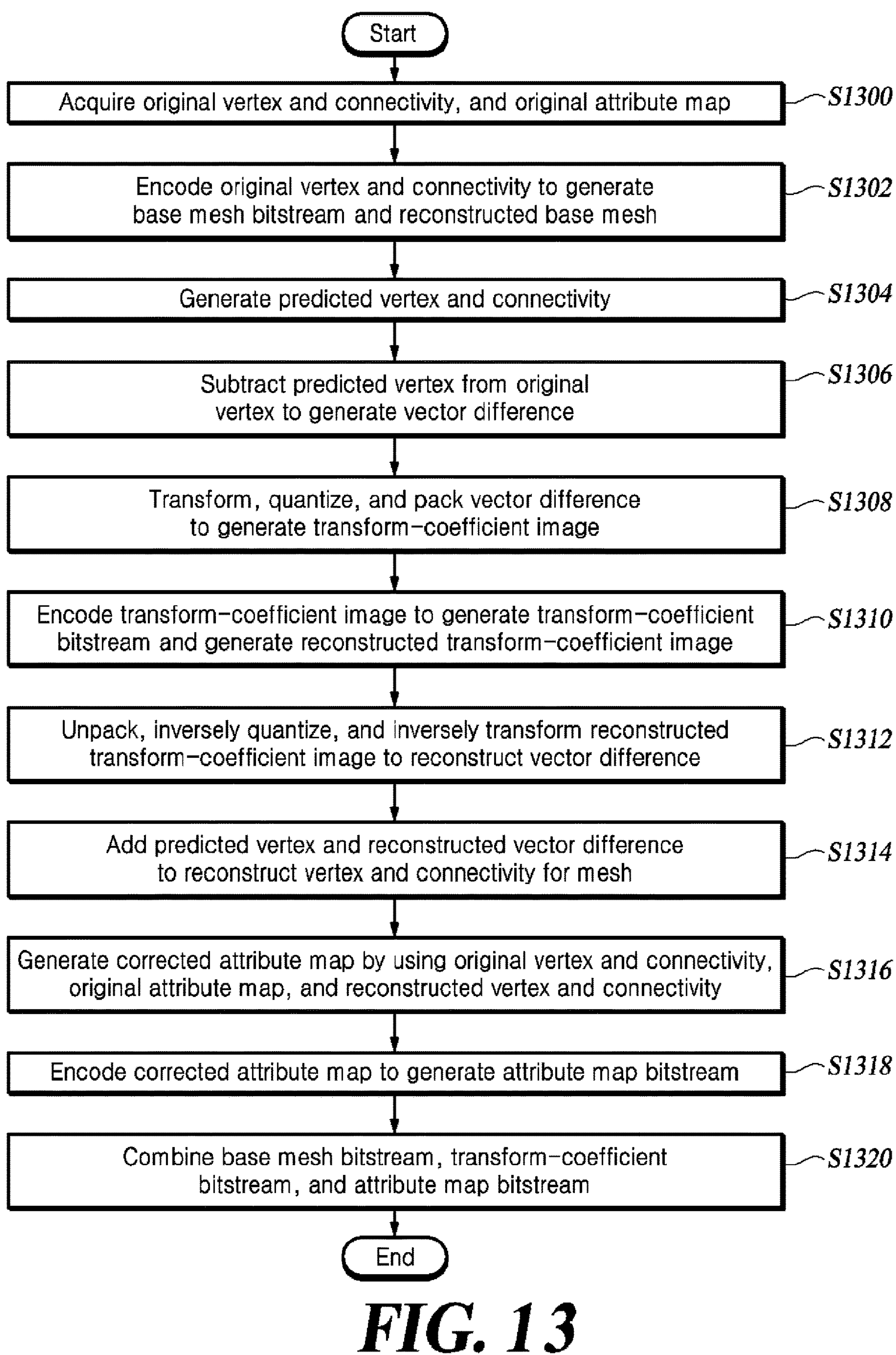
FIGS. 13 and 14 are flowcharts illustrating a method for encoding a mesh by a mesh encoding device according to an embodiment of the present disclosure.
Figure 14:
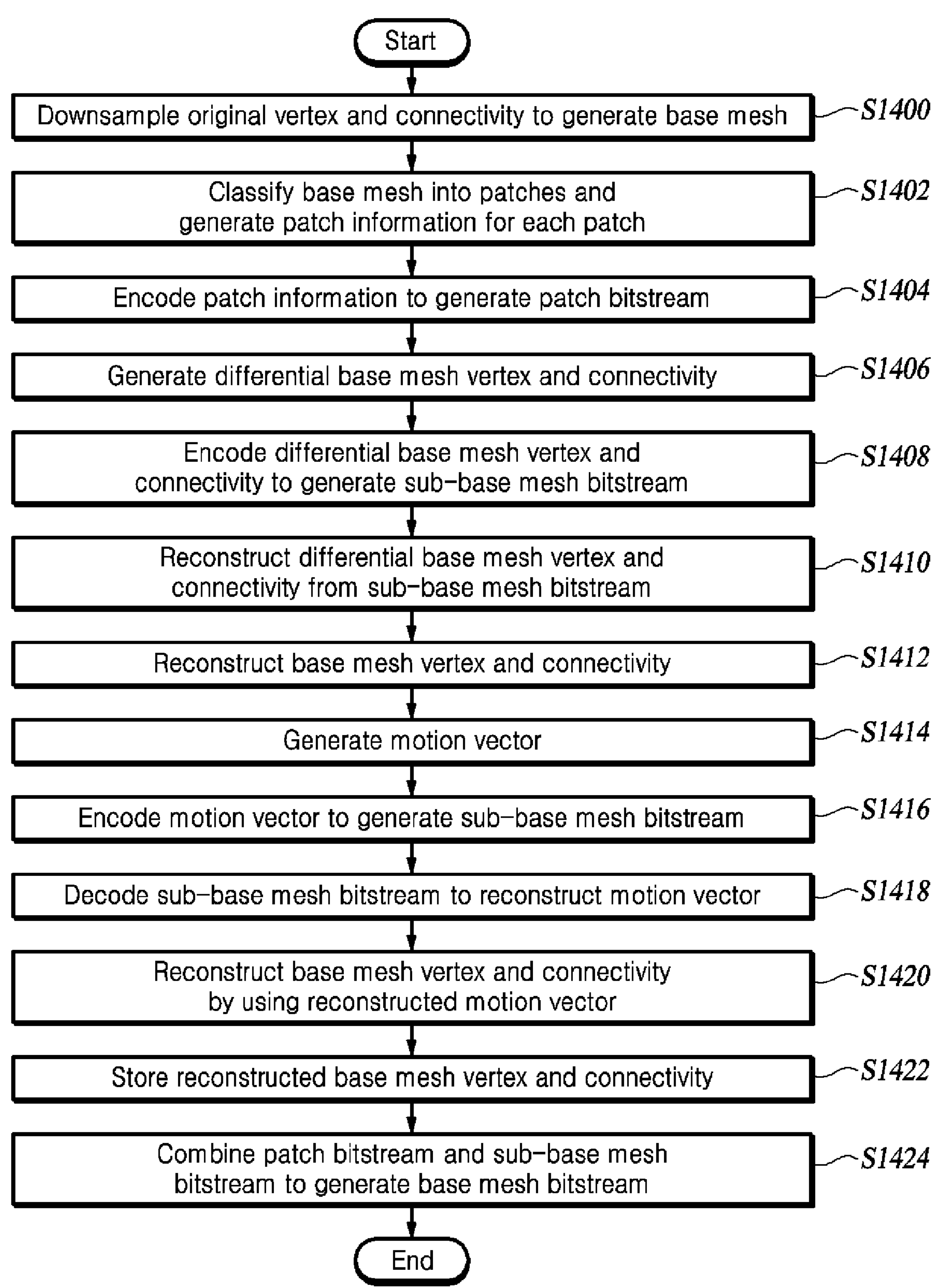

FIGS. 13 and 14 are flowcharts illustrating a method of encoding a mesh by a mesh encoding device according to an embodiment of the present disclosure.

The encoding device acquires original vertices and connectivity, and original attribute maps for a mesh (S1300).

The encoding device encodes the original vertices and connectivity to generate a base mesh bitstream and a reconstructed base mesh (S1302). Here, the reconstructed base mesh includes reconstructed base mesh vertices and connectivity.

The encoding device generates predicted vertices and connectivity based on the reconstructed base mesh vertices and connectivity (S1304). Here, the predicted vertices include reconstructed base mesh vertices and sub-vertices.

The encoding device may perform surface split based on the reconstructed base mesh vertices and connectivity to generate sub-vertices. In addition, the encoding device may generate connectivity connecting the generated sub-vertices to the existing base mesh vertices. The generated sub-vertices may become predicted vertices together with the reconstructed base mesh vertices.

The encoding device subtracts the predicted vertex from the original vertex based on the original vertex and connectivity and the predicted vertex and connectivity to generate a vector difference (S1306).

The encoding device transforms, quantizes, and packs the vector differences to generate a transform-coefficient image (S1308).

The encoding device encodes the transform-coefficient image by using a video encoding method to generate a transform-coefficient bitstream and to generate a reconstructed transform-coefficient image (S1310).

The encoding device unpacks, dequantizes, and inversely transforms the reconstructed transform-coefficient image to reconstruct the vector differences (S1312).

The encoding device adds the predicted vertex and reconstructed vector difference to reconstruct the vertex and connectivity for the mesh (S1314).

The encoding device generates a corrected attribute map by using the original vertex and connectivity, the original attribute map, and the reconstructed vertex and connectivity (S1316).

In addition, the encoding device may apply padding and color space conversion to the corrected attribute map.

The encoding device encodes the corrected attribute map by using a video encoding method to generate an attribute map bitstream (S1318).

The encoding device combines the base mesh bitstream, the transform-coefficient bitstream, and the attribute map bitstream (S1320).

Meanwhile, the operation of generating the base mesh bitstream and the reconstructed base mesh (S1302) may include the following operations.

The encoding device downsamples the original vertex and connectivity to generate a base mesh (S1400). Here, the base mesh includes the base mesh vertex and connectivity.

The encoding device classifies the base mesh into a plurality of patches by using the base mesh vertex and connectivity and generates patch information for each patch (S1402). Here, the patch information includes the offset and size of each patch.

The encoding device encodes the patch information to generate a patch bitstream (S1404).

The encoding device subtracts the offset from position coordinate values of the base mesh vertices to generate differential base mesh vertices and connectivity (S1406).

The encoding device encodes the differential base mesh vertices and connectivity based on the static mesh encoding method to generate a sub-base mesh bitstream (S1408).

The encoding device reconstructs the differential base mesh vertices and connectivity from the sub-base mesh bitstream (S1410).

The encoding device adds the reconstructed differential base mesh vertices and offset to reconstruct the base mesh vertices and connectivity (S1412).

The encoding device performs motion prediction based on the original vertices and connectivity and the reconstructed base mesh vertices and connectivity of the previous frame to generate a motion vector (S1414).

The encoding device encodes the motion vector to generate a sub-base mesh bitstream (S1416).

The encoding device decodes the sub-base mesh bitstream to reconstruct the motion vector (S1418).

The encoding device compensates for the motion of the reconstructed base mesh vertex of the previous frame by using the reconstructed motion vector to reconstruct the base mesh vertex and connectivity (S1420).

The encoding device stores the reconstructed base mesh vertex and connectivity (S1422).

The encoding device combines the patch bitstream and the sub-base mesh bitstream to generate a base mesh bitstream (S1424).

Figure 15:
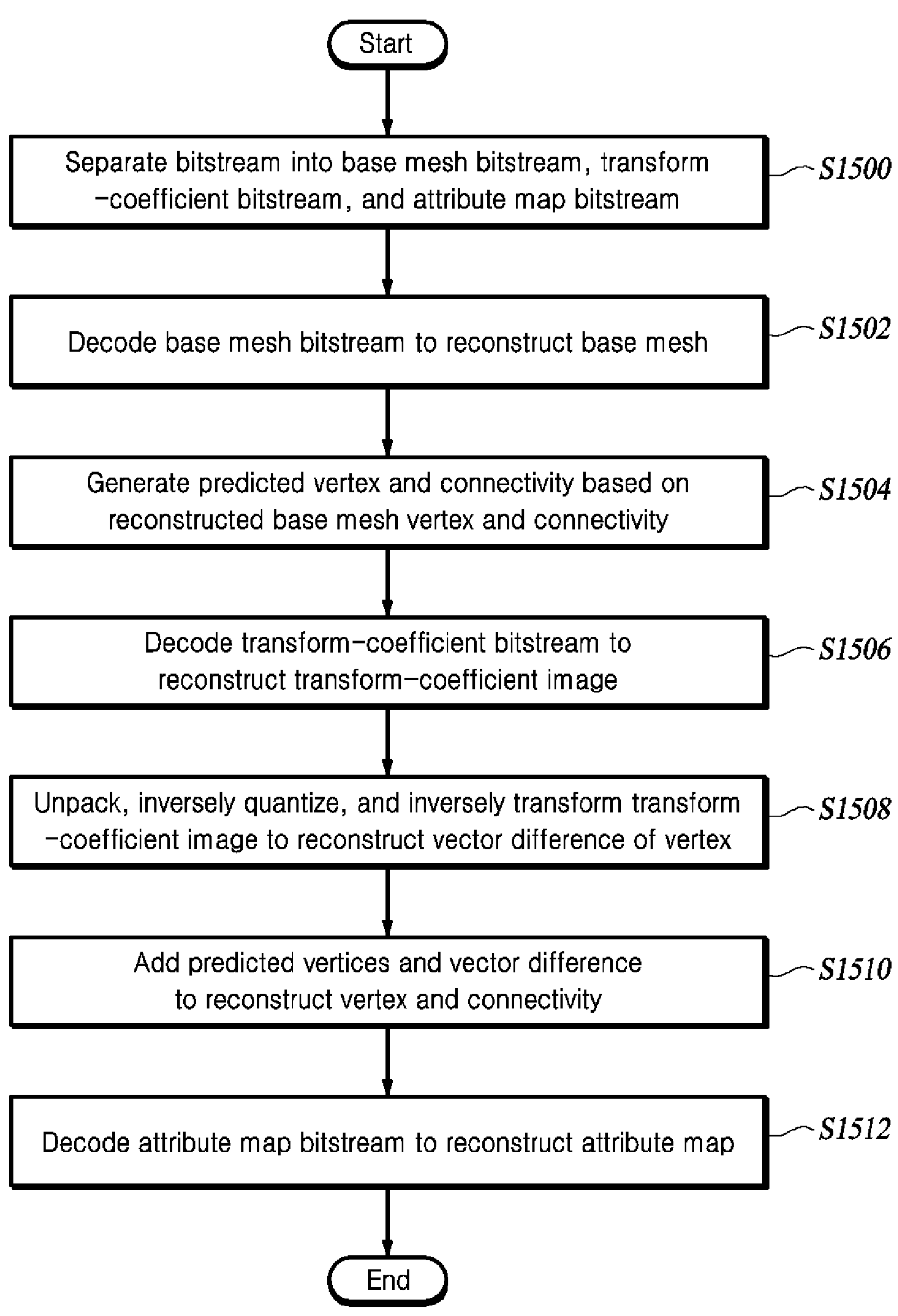
FIGS. 15 and 16 are flowcharts illustrating a method for decoding a mesh by a mesh decoding device according to an embodiment of the present disclosure.
Figure 16:
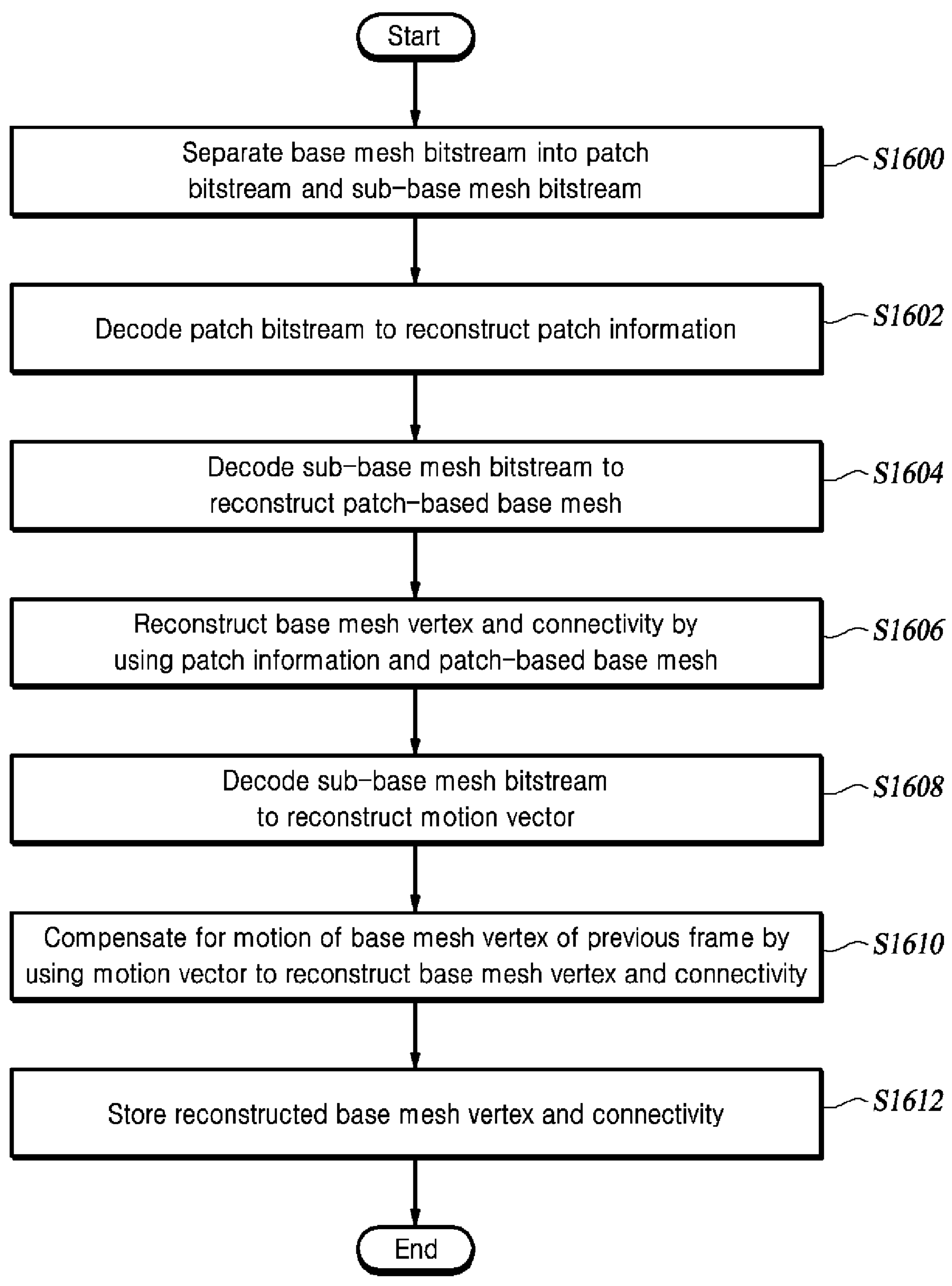

FIGS. 15 and 16 are flowcharts illustrating a method of decoding a mesh by a mesh decoding device according to an embodiment of the present disclosure.

The decoding device separates a bitstream into a base mesh bitstream, a transform-coefficient bitstream, and an attribute map bitstream (S1500).

The decoding device decodes the base mesh bitstream to reconstruct the base mesh (S1502). Here, the reconstructed base mesh includes reconstructed base mesh vertices and connectivity.

The decoding device generates predicted vertices and connectivity based on the reconstructed base mesh vertices and connectivity (S1504). Here, the predicted vertices include reconstructed base mesh vertices and sub-vertices.

The decoding device may perform surface split based on the reconstructed base mesh vertices and connectivity to generate sub-vertices. In addition, the decoding device may generate connectivity connecting the generated sub-vertices and existing base mesh vertices. The generated sub-vertices may become predicted vertices together with the reconstructed base mesh vertices.

The decoding device decodes the transform-coefficient bitstream to reconstruct the transform-coefficient image (S1506).

The decoding device unpacks, dequantizes, and inversely transforms the transform-coefficient image to reconstruct the vector difference of the vertex (S1508).

The decoding device adds the predicted vertices and the vector differences to reconstruct the vertices and connectivity (S1510).

The decoding device decodes the attribute map bitstream based on the video decoding method to reconstruct the attribute map (S1512).

In addition, the decoding device may apply color space conversion to the reconstructed attribute map.

Meanwhile, the operation (S1502) of reconstructing the base mesh may include the following operations.

The decoding device separates the base mesh bitstream into a patch bitstream and a sub-base mesh bitstream (S1600).

The decoding device decodes the patch bitstream to reconstruct patch information (S1602). Here, the patch information includes an offset and a size of each patch.

The decoding device decodes the sub-base mesh bitstream to reconstruct the patch-based base mesh (S1604).

The decoding device reconstructs the base mesh vertices and connectivity by using the patch information and the patch-based base mesh (S1606).

The decoding device corrects the patch-based base mesh by adding the offset to the patch-based base mesh. Thereafter, the decoding device may collect the corrected patch-based base meshes in the same space to generate the base mesh vertices and connectivity.

The decoding device decodes the sub-base mesh bitstream to reconstruct the motion vector (S1608).

The decoding device compensates for the motion of the base mesh vertices of the previous frame by using the motion vector to reconstruct the base mesh vertices and connectivity (S1610).

The decoding device stores the reconstructed base mesh vertices and connectivity (S1612).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

1002: bitstream separator
1004: base mesh decoder
1006: mesh surface splitter
1008, 1018: video decoder
1010: image unpacker
1012: inverse quantizer
1014: inverse transformer
1016: vertex adder
1020: color space converter

The invention claimed is:

1. A method of decoding a mesh, performed by a mesh decoding device, the method comprising:
separating a bitstream into a base mesh bitstream, a transform-coefficient bitstream, and an attribute map bitstream, wherein the base mesh bitstream includes a patch bitstream and a sub-base mesh bitstream; and
decoding the base mesh bitstream to reconstruct a base mesh including base mesh vertices and connectivity,
wherein reconstructing the base mesh includes:
decoding the patch bitstream to reconstruct patch information, wherein the patch information includes an offset and a size of each patch;
decoding the sub-base mesh bitstream to reconstruct a patch-based base mesh; and
reconstructing the base mesh vertices and connectivity by using the patch information and the patch-based base mesh.

2. The method of claim 1, further comprising:
performing surface split based on the reconstructed base mesh vertices and connectivity to generate predicted vertices and connectivity, wherein the predicted vertices include the reconstructed base mesh vertices and sub-vertices;
decoding the transform-coefficient bitstream based on a video decoding method to reconstruct vector differences of vertices for the mesh;
adding the predicted vertices and vector differences to reconstruct vertices and connectivity; and
decoding the attribute map bitstream based on the video decoding method to reconstruct an attribute map.

3. The method of claim 2, wherein generating the predicted vertices and connectivity includes:
performing the surface split based on the base mesh vertices and connectivity to generate a sub-vertex; and
generating connectivity connecting the sub-vertex to the base mesh vertices.

4. The method of claim 2, wherein reconstructing the vector differences of the vertices includes:
decoding the transform-coefficient bitstream to reconstruct a transform-coefficient image; and
generating transform-coefficients of the vertices from the transform-coefficient image.

5. The method of claim 4, wherein reconstructing the vector differences of the vertices includes:
inversely quantizing the transform-coefficients; and
inversely transforming the inversely quantized transform-coefficients to reconstruct the vector differences of the vertices.

6. The method of claim 1, wherein reconstructing the base mesh includes:
separating the base mesh bitstream into the patch bitstream and the sub-base mesh bitstream; and
storing the reconstructed base mesh vertices and connectivity.

7. The method of claim 1, wherein reconstructing the base mesh vertices and connectivity includes:
adding the offset to the patch-based base mesh to correct the patch-based base mesh; and collecting corrected patch-based base meshes in a same space to generate the base mesh vertices and connectivity.

8. The method of claim 1, wherein reconstructing the base mesh includes:

decoding the sub-base mesh bitstream to reconstruct a motion vector;

compensating for a motion of base mesh vertices of a previous frame by using the motion vector to reconstruct the base mesh vertices and connectivity; and storing the reconstructed base mesh vertices and connectivity.

9. A method of encoding a mesh, performed by a mesh encoding device, the method comprising:

acquiring original vertices and connectivity, and an original attribute map for the mesh;

encoding the original vertices and connectivity to generate a base mesh bitstream; and generating a reconstructed base mesh including reconstructed base mesh vertices and connectivity from the base mesh bitstream, wherein generating the base mesh bitstream includes:

downsampling the original vertices and connectivity to generate a base mesh, wherein the base mesh includes base mesh vertices and connectivity;

classifying the base mesh into a plurality of patches by using the base mesh vertices and connectivity and generating patch information of each patch, wherein the patch information includes an offset and a size of each patch; and subtracting the offset from position coordinate values of the base mesh vertices to generate differential base mesh vertices and connectivity.

10. The method of claim 9, further comprising:

performing surface split based on the reconstructed base mesh vertices and connectivity to generate predicted vertices and connectivity, wherein the predicted vertices include the reconstructed base mesh vertices and sub-vertices; and subtracting the predicted vertices from the original vertices based on the original vertices and connectivity and the predicted vertices and connectivity to generate vector differences.

11. The method of claim 10, further comprising:

transforming, quantizing, and packing the vector differences to generate a transform-coefficient image; and encoding the transform-coefficient image by using a video encoding method to generate a transform-coefficient bitstream.

12. The method of claim 11, further comprising:

generating a reconstructed transform-coefficient image from the transform-coefficient bitstream;

unpacking, inversely quantizing, and inversely transforming the reconstructed transform-coefficient image to reconstruct the vector differences; and adding the predicted vertices and the reconstructed vector differences to reconstruct vertices and connectivity for the mesh.

13. The method of claim 12, further comprising:

generating a corrected attribute map by using the original vertices and connectivity, the original attribute map, and the reconstructed vertices and connectivity;

encoding the corrected attribute map by using the video encoding method to generate an attribute map bitstream; and combining the base mesh bitstream, the transform-coefficient bitstream, and the attribute map bitstream.

14. The method of claim 9, wherein generating the base mesh bitstream includes:

encoding the patch information to generate a patch bitstream;

encoding the differential base mesh vertices and connectivity based on a static mesh encoding method to generate a sub-base mesh bitstream; and combining the patch bitstream and the sub-base mesh bitstream to generate the base mesh bitstream.

15. The method of claim 9, wherein generating the reconstructed base mesh includes:

reconstructing the differential base mesh vertices and connectivity from the sub-base mesh bitstream;

adding the reconstructed differential base mesh vertices and the offset to generate the reconstructed base mesh vertices and connectivity; and storing the reconstructed base mesh vertices and connectivity.

16. The method of claim 9, wherein generating the base mesh bitstream includes:

performing motion prediction based on the original vertices and connectivity and reconstructed base mesh vertices and connectivity of a previous frame to generate a motion vector; and encoding the motion vector to generate the sub-base mesh bitstream.

17. The method of claim 16, wherein generating the reconstructed base mesh includes:

decoding the sub-base mesh bitstream to reconstruct the motion vector;

compensating for the motion of the reconstructed base mesh vertices of the previous frame by using the reconstructed motion vector to generate the reconstructed base mesh vertices and connectivity; and storing the reconstructed base mesh vertices and connectivity.

18. A method of transmitting a bitstream, the method comprising:

generating the bitstream by a mesh encoding method; and transmitting the bitstream, wherein the mesh encoding method comprises:

acquiring original vertices and connectivity, and an original attribute map for mesh;

encoding the original vertices and connectivity to generate a base mesh bitstream; and generating a reconstructed base mesh including reconstructed base mesh vertices and connectivity from the base mesh bitstream, wherein generating the base mesh bitstream includes:

downsampling the original vertices and connectivity to generate a base mesh, wherein the base mesh includes base mesh vertices and connectivity;

classifying the base mesh into a plurality of patches using the base mesh vertices and connectivity and generating patch information of each patch, wherein the patch information includes an offset and a size of each patch; and subtracting the offset from position coordinate values of the base mesh vertices to generate differential base mesh vertices and connectivity.

* * * * *